(12) United States Patent  
Rhinefrank et al.

(10) Patent No.: US 8,659,179 B2  
(45) Date of Patent: Feb. 25, 2014

(54) DIRECT DRIVE ROTARY WAVE ENERGY CONVERSION

(71) Applicant: Columbia Power Technologies, Inc., Charlottesville, VA (US)

(72) Inventors: Kenneth Edward Rhinefrank, Corvallis, OR (US); Bradford Storrs Lamb, Charlottesville, VA (US); Joseph Horan Prudell, Corvallis, OR (US); Alphonse Aloysius Schacher, Corvallis, OR (US)

(73) Assignee: Columbia Power Technologies, Inc., Charlottesville, VA (US)

( * ) Notice: Subject to any disclaimer, the term of this patent is extended or adjusted under 35 U.S.C. 154(b) by 0 days.

(21) Appl. No.: 13/964,630

(22) Filed: Aug. 12, 2013

(65) Prior Publication Data

US 2013/0328313 A1      Dec. 12, 2013

Related U.S. Application Data

(63) Continuation of application No. 13/657,145, filed on Oct. 22, 2012, now Pat. No. 8,508,063, which is a continuation of application No. 12/656,950, filed on Feb. 22, 2010, now Pat. No. 8,314,506.

(60) Provisional application No. 61/202,351, filed on Feb. 20, 2009.

(51) Int. Cl.
| | |
|---|---|
| *F03B 13/10* | (2006.01) |
| *F03B 13/12* | (2006.01) |
| *H02P 9/04* | (2006.01) |

(52) U.S. Cl.
USPC .......................................................... 290/53

(58) Field of Classification Search
USPC .......................................... 290/53, 42, 43, 54
See application file for complete search history.

(56) References Cited

U.S. PATENT DOCUMENTS

| | | | |
|---|---|---|---|
| 3,631,670 | A | 1/1972 | Vassilakis |
| 4,098,084 | A | 7/1978 | Cockerell |
| 4,118,932 | A | 10/1978 | Sivill |
| 4,170,898 | A | 10/1979 | Salter |
| 4,179,886 | A | 12/1979 | Tsubota |

(Continued)

FOREIGN PATENT DOCUMENTS

| | | |
|---|---|---|
| JP | 11187609 A | 7/1999 |
| JP | 2006226274 A | 8/2006 |
| WO | 2008014584 A1 | 2/2008 |
| WO | 2008063086 A2 | 5/2008 |

OTHER PUBLICATIONS

International Search Report with Written Opinion issued May 17, 2010 received in corresponding International Patent Application No. PCT/US10/00505 (3 pages).

(Continued)

*Primary Examiner* — Javaid Nasri  
(74) *Attorney, Agent, or Firm* — Pierce Atwood LLP; Kevin M. Farrell; Robert L. Hover

(57) ABSTRACT

An apparatus and method for converting wave energy using the relative rotational movement between two interconnected float assemblies and the relative rotational movement between each of the float assemblies and a spar which extends from a connection with the float assemblies at the water surface into the water.

19 Claims, 11 Drawing Sheets

(56) References Cited

U.S. PATENT DOCUMENTS

| | | |
|---|---|---|
| 4,319,454 A | 3/1982 | Lucia |
| 4,389,843 A | 6/1983 | Lamberti |
| 4,408,455 A * | 10/1983 | Montgomery ............. 60/505 |
| 4,608,497 A | 8/1986 | Boyce |
| 4,718,231 A | 1/1988 | Vides |
| 4,781,023 A | 11/1988 | Gordon |
| 5,066,867 A | 11/1991 | Shim |
| 5,132,550 A | 7/1992 | McCabe |
| 5,808,368 A | 9/1998 | Brown |
| 6,109,029 A | 8/2000 | Vowles et al. |
| 6,269,636 B1 | 8/2001 | Hatzilakos |
| 7,315,092 B2 | 1/2008 | Cook |
| 7,444,810 B2 | 11/2008 | Olson |
| 7,877,994 B2 | 2/2011 | Bull et al. |
| 2006/0208494 A1 | 9/2006 | Cook |
| 2007/0266704 A1 | 11/2007 | Bull et al. |
| 2008/0169653 A1 | 7/2008 | Olson |
| 2010/0007225 A1 | 1/2010 | Platon et al. |
| 2010/0140944 A1 | 6/2010 | Gardiner et al. |

OTHER PUBLICATIONS

Extended European Search Report issued Mar. 8, 2013 received in corresponding European Patent Application No. 10744077.8 (7 pages).

Shrestha, et al. "Direct Drive Wind Turbine Generator with Magnetic Bearing", Proceedings of the European Offshore Wind Conference and Exhibition, Dec. 4-6, 2007, Berlin, Germany [retrieved from the internet May 4, 2010], URL ,http://www.eow2007proceedings.info/allfiles2/194_Eow2007fullpaper.pdf>.

* cited by examiner

DIRECT DRIVE ROTARY WAVE ENERGY CONVERSION

BACKGROUND OF INVENTION

The present invention relates to the extraction of energy from water waves found in oceans or other large bodies of water and, in particular, the conversion of wave energy into electrical energy. Water waves that form in large bodies of water contain kinetic and potential energy that the device and methodology of the present invention is designed to extract. More specifically, the object of the present invention is to provide structures and methods to efficiently convert the hydrodynamic surge (horizontal component) and heave (vertical component) of ocean wave energy into rotary shaft motion for use in direct drive rotary generation.

SUMMARY OF INVENTION

We describe a unique approach for converting wave motion to mechanical rotary motion. A wave energy converter (WEC) that extracts energy from both the heave and surge energy contained in an ocean wave so as to allow for twice the energy extraction potential of other systems that only extract energy from heave motion in the waves.

We also describe a wave energy converter that provides a wave to rotary energy approach that will work with a DDR generator or any other power take off (PTO) driven by a mechanical rotary drive shaft. The system may allow, but is not limited to, the use of large diameter, high torque and low speed direct driven rotary (DDR) generators in wave energy applications and may allow for a more cost effective and efficient conversion of wave energy as compared to other methods of conversion.

We also describe a method by which the ocean wave forces can be coupled to create low speed high torque rotation. This rotation can then be coupled to the DDR generator or other PTO. This PTO may include all forms of rotary power conversion; such as a large direct driven rotary electric generator, a gear box driven electric generator, a belt driven electric generator, water pumping systems, water desalination, pneumatic pumping systems and even hydraulic pumps, and similar devices.

The structure and methodology includes mechanical implementations that, among other things, allow for an increase in the rotary speed of the main drive shaft. They also provide for methods of implementation that increase the magnetic flux velocity in the generator air gap.

BRIEF DESCRIPTION OF DRAWINGS

The invention will become more readily appreciated by reference to the following detailed descriptions, when taken in conjunction with the accompanying drawings, wherein.

DETAILED DESCRIPTION OF INVENTION

Figure 1:
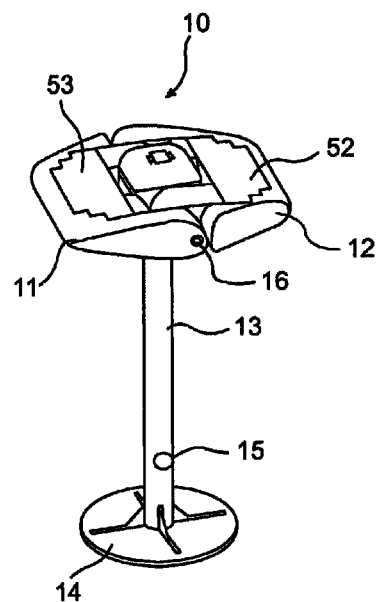
FIG. 1 is an isometric view of a wave energy converter.

A wave energy converter 10, shown in FIG. 1, is comprised of a fore float 11 and an aft float 12. These floats 11, 12 are rotably attached to spar 13. The floats 11, 12 are attached through drive shafts 18 and 19 (shown in FIG. 3) to a mechanical rotary system that utilizes the speed or torque to perform mechanical work (electric generation, water pumping, or similar function). As seen in FIG. 1, the outer body is comprised of three components: the spar 13; the fore float 11; and the aft float 12. The floats 11 and 12 are connected together by bearing shafts 16 and 17 (the latter of which is shown in FIG. 3) such that fore float 11 and aft float 12 can rotate relative to each other.

Figure 2:
FIG. 2 is a representational drawing of an ocean wave.

Water waves 20 are comprised of rotational particle motions that are grossly depicted in FIG. 2, heave, which creates vertical up force 21 and vertical down force 22 on bodies exposed to the wave, and surge which creates horizontal force 23, that a wave imparts to a body. The magnitude of the rotational forces 22 and 23, depicted in FIG. 2, are highest at the water's surface, and diminish as the water depth increases. The floats 11 and 12 of FIG. 1 experience vertical forces due to the heave of wave 20.

Figure 3:
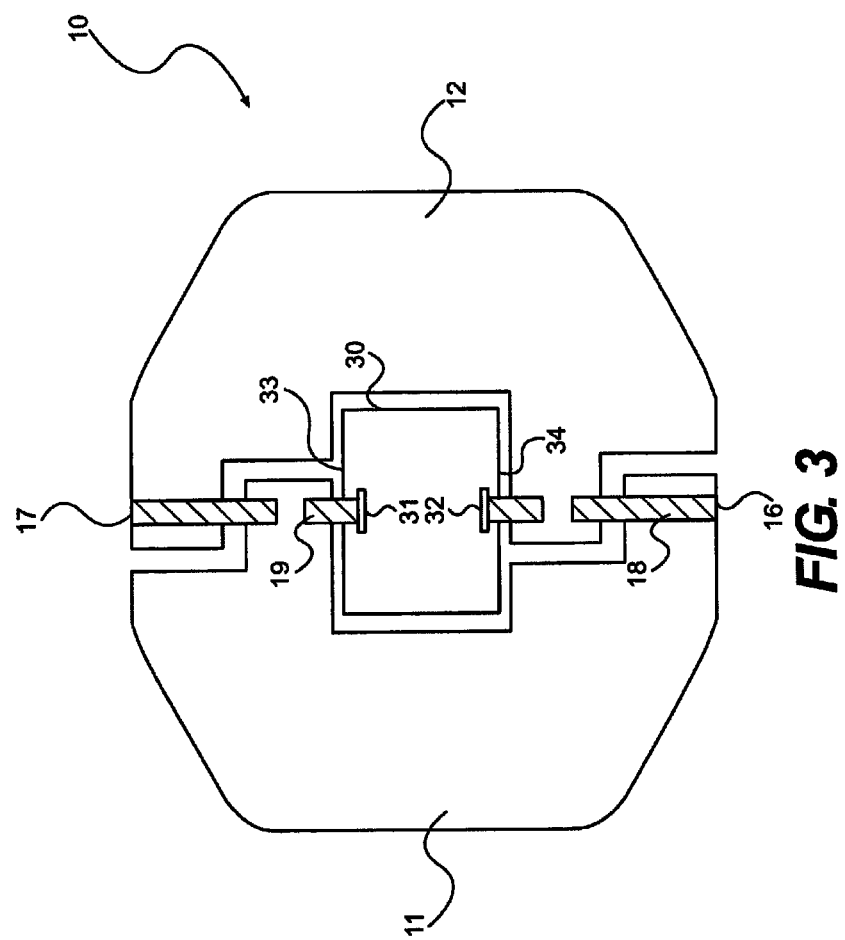
FIG. 3 is a cross-sectional view of an example wave energy converter.

In FIG. 3, the floats 11 and 12 interconnect through bearing shafts 16 and 17 so as to permit relative movement between them. Driveshaft 19 connects float 11 to driveshaft flange 31 by passing through a motor housing 30 mounted to the top of spar 13. Rotation between the driveshaft 19 and motor housing 30 is accommodated by a sealed spar bearing 33. The sealed spar bearing 33 permits rotation of driveshaft 19 relative to housing 30 but keeps water out of the motor housing 30. In similar fashion, driveshaft 18 connects float 12 to driveshaft flange 32 by passing through motor housing 30. Rotation between the driveshaft 19 and motor housing 30 is accommodated by sealed spar bearing 34, which also seals the housing 30 so as to keep out water. Driveshaft flange 31 is mounted to a stator assembly of a generator and driveshaft flange 32 is mounted to a rotor assembly of a generator. Alternatively, driveshaft flanges 31 can connect to a rotor assembly of a first generator and driveshaft flange 32 can connect to a rotor assembly of a second generator, with the stator of each being fixedly mounted inside motor housing 30. In one embodiment, two 80 ton generators are employed.

As shown in FIG. 3, the float surface area is maximized by staggering the fore float 11 and aft float 12 about an axis of rotation. The bearing shaft 17 and bearing shaft 16 of FIG. 3 are axis centric on opposite sides of wave energy converter 10. The placement of these bearing shafts allow for only relative rotational motion about the axis between the fore float 11 an aft float 12. While this approach of coupling the fore float 11 and aft float 12 with a bearing system that is independent of the spar is not essential for function of the system, it allows for reduction of forces on the spar bearings 33 and 34.

The spar heave plate 14 shown in FIG. 1 is exposed to smaller heave forces due to its depth below the water surface. The placement of that plate below the surface encourages the spar 13 to remain relatively stationary in the vertical direction and resist the vertical motion of the floats 11 and 12.

Figure 8:
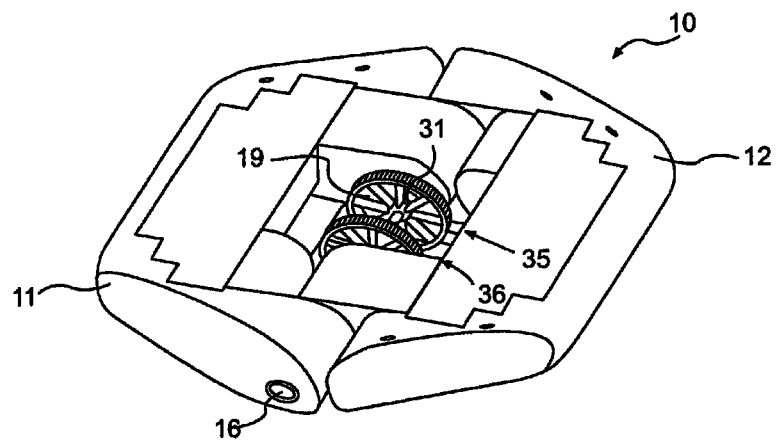
FIG. 8 is a partial cut-away view of an embodiment of an example wave energy converter.

A Power Take Off (PTO) can be mounted in the spar 13 or floats 11 and 12, and may be mounted in any location as appropriate for the specific design considerations. A first and second direct drive rotary generation PTO 35 and 36 are shown in FIG. 8, but any mechanical power transfer system such as a DDR generator (previously mentioned), a gear box driven electric generator, a belt driven electric generator, water pumping systems, water desalination, pneumatic pumping systems, even hydraulic pumps, or similar can be used.

In one embodiment, the first PTO 35 is connected to drive shaft 19 through flange 31. The second PTO 36 is connected to drive shaft 18 through flange 32 (not shown in FIG. 8). The relative rotational motion between the spar 13 and the floats 11 and 12 drives the first and second PTO to convert wave motion to useable power. As described earlier, the pitching action of the spar (surge energy) and the pitching action of the float (heave energy) are combined to create a net sum that is complementary and produces a combined speed and force that is greater then the individual float or spar energies. This net energy is transferred to the PTO to perform work such as electrical generation, water pumping, air pumping, or similar effort.

In another embodiment, a single PTO can be connected to drive shafts 18 and 19, such that a rotor (not shown) is attached to the fore float 11 and the stator is attached to the aft float 12 (or visa-versa). The heave motion of this system creates relative rotational motion between the floats 11 and 12. By connecting the PTO only between the floats, the only energy captured is the energy from the relative motion between the floats. Hydrodynamic modeling has shown that the motion between the floats is increased by the addition of the spar system and its contribution of pitch heave response on the float bodies. However, an advantage to this arrangement is the increased rotary speeds and reduced generator costs. Because the stator and rotor are both turned in opposite directions by the float motion, the relative speed between the rotor and stator is twice that of a spar mounted stator. It is well known in the art of generator design that increased speed, in general, allows for reduced cost.

Figure 9:
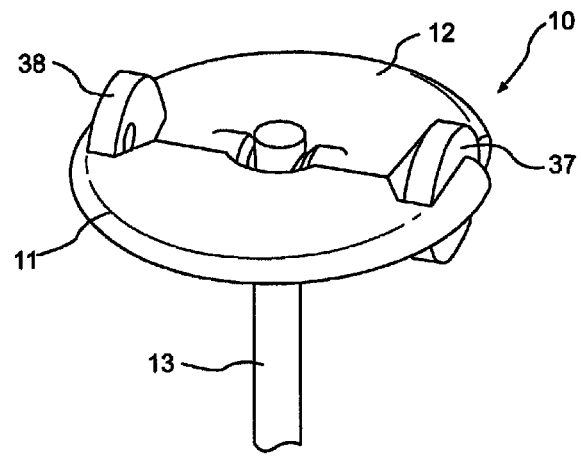
FIG. 9 is an isometric view of an embodiment of an example wave energy converter.

In another embodiment, two PTO's can be mounted within housing 30, or mounted on the surface outside of the spar, encased in a water tight enclosure on the port and starboard sides of the system as shown in FIG. 9. In this second arrangement, PTO 37 has a rotor (not shown) attached to one float 11 and a stator (not shown) attached to the other float 12. The reverse is true of the PTO 38, which has a rotor (not shown) attached to float 12 and a stator (not shown) attached to float 11. Both PTO's are driven by the relative motion between the floats 11 and 12. The same advantage of increased generator speed is realized between stator and rotor, because each is being rotated in opposite directions.

Figure 4C:
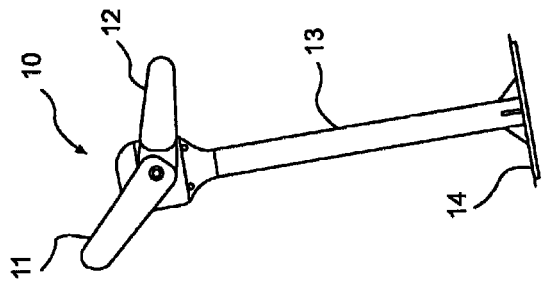
FIGS. 4A-4C are isometric views of an example wave energy converter.
Figure 4B:
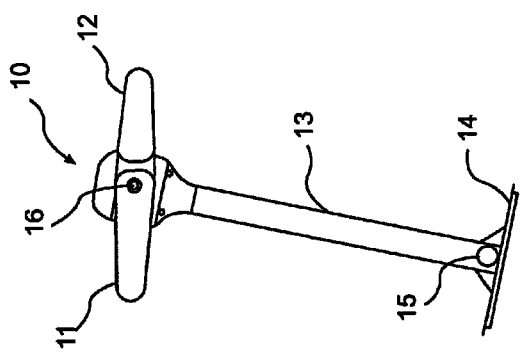
Figure 4A:
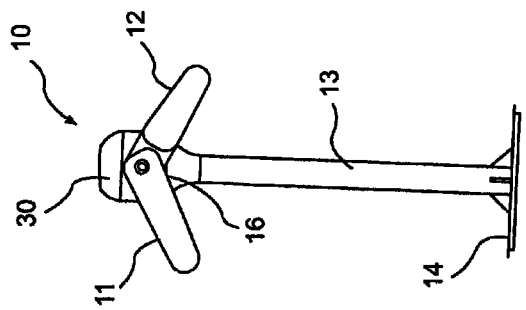

FIGS. 4A-4C depict various positions of the floats 11 and 12 relative to each other and relative to spar 13 as different wave conditions are encountered by the wave energy converter 10. More specifically, FIG. 4A shows a situation in which the spar 13 is essentially perpendicular to the horizon and float 11 and float 12 have rotated downward. In FIG. 4B, floats 11 and 12 have rotated about bearing shaft 16 so as to be roughly horizontal while spar 13 has rotated off of the vertical position. In FIG. 4C, float 11 has rotated clockwise, above the horizon, float 12 has also rotated clockwise, but to an angle below the horizon, while spar 13 has rotated counterclockwise about seal bearings 33 and 34. The movement of floats 11 and 12 and spar 13 being in reaction to wave forces acting upon them, with each movement leading to the potential conversion of wave energy by wave energy converter 10. Floats 11 and 12 will rotate up and down with each wave's incoming crest and trough, experiencing rotational motion with respect to the spar 13 due to heave forces acting on the floats.

The floats 11 and 12 of FIG. 1, experience horizontal forces 21 and 22 due to wave surges shown in FIG. 2. The floats 11 and 12 are allowed to rotate with respect to the spar 13. FIG. 4B depicts the floats 11 and 12, and spar 13 being pulled by surge forces to the right. The surge forces are minimal at the bottom of the spar 13 and at the heave plate 14. This difference in horizontal loading between the top of spar 13 and the bottom of that spar causes a moment about the spar body, so as to cause the spar to pitch right as depicted in FIG. 4B. The system is ballasted and designed to achieve a desired pivot point 15 on spar 13, this pivot point affects the speed of the pitching action and the amount of power absorbed. The optimization of this pitching action is the designers' prerogative based on design priorities upon reading and understanding this disclosure, but ideally the pivot point 15 is between the motor housing 30 but above the heave plate 14. As the spar 13 pitches fore and aft, the spar 13 and floats 11 and 12 experience relative rotational motion.

In both cases, surge and heave forces, the floats 11 and 12 rotate about spar 13 with speed and torque to transmit power through drive shafts 18 and 19. The net affect of these heave and surge driven rotary motions is hypothesized and numerically modeled to be complementary (not opposing) in direction and force. The synthesis of these two motions is depicted in FIG. 4C, where it is shown that the net effect of both heave and surge forces will act on the wave energy converter 10 and that converter will absorb power from both modes (heave and surge) of wave motion. The system may work in either mode of operation to capture energy by using heave motion or surge motion as depicted, or both.

As an electrical generating system, a reduced cost of energy (CoE) is expected to be an advantage over other approaches. The wave energy absorber has the potential to be half the size of a competing wave energy converter of the same power rating. That size reduction reduces capital costs and CoE. The CoE is further reduced by reducing the capital expenditure of the generator by optimizing the electromagnetic design using a large diameter generator when low-speed high-torque rotary motion is employed. Operating and maintenance costs are reduced by the systems operational design; there are minimal moving parts, and the parts that do move do so fluidly, with the incoming waves, so as to reduce the affect of snap loading often experienced by marine deployed bodies. This construction and approach reduces repair time and cost. The speed of rotation and driving torque are both increased by the extraction of both heave and surge energy. Increasing the speed of body motions helps to reduce generator capital costs and the system components may be designed to satisfy this priority. In some methods described in this disclosure, reliability is improved by the elimination of all intermediate conversion stages. The WEC Survivability is another advantage of this system. The combined effect of the design results in a fluid motion of the wave converter in the ocean which reduces structural loading, reduces mooring loading, and accommodates for tidal variation.

These methods described utilize rotary motion from a WEC to allow for a point absorber design that captures the heave and surge energy components of the incoming wave energy. By capturing both the surge and heave component, the maximum possible energy capture width of the wave energy device is $\lambda/\pi$ (where $\lambda$=wave length) as compared to $\lambda/2\pi$ for a device that captures only the heave component. This improvement in capture width is expected to reduce the size and cost of the wave energy converter. The exact generator, pump, or rotary mechanisms for this application is not essential to the claims of this invention because it is applicable to any mechanism or system that is driven by a rotary shaft.

Figure 6:
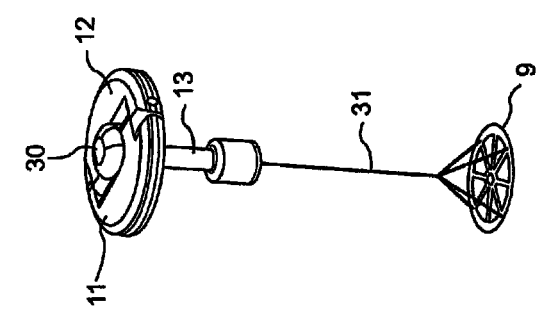
FIG. 6 is an isometric view of an example wave energy converter.
Figure 5:
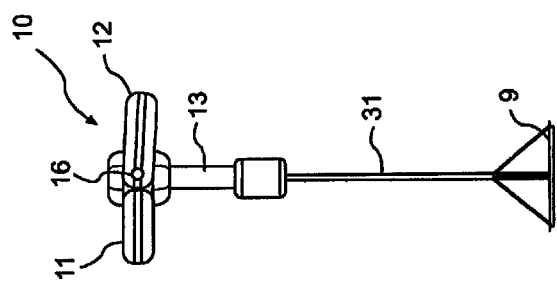
FIG. 5 is an isometric view of an example wave energy converter.
Figure 7:
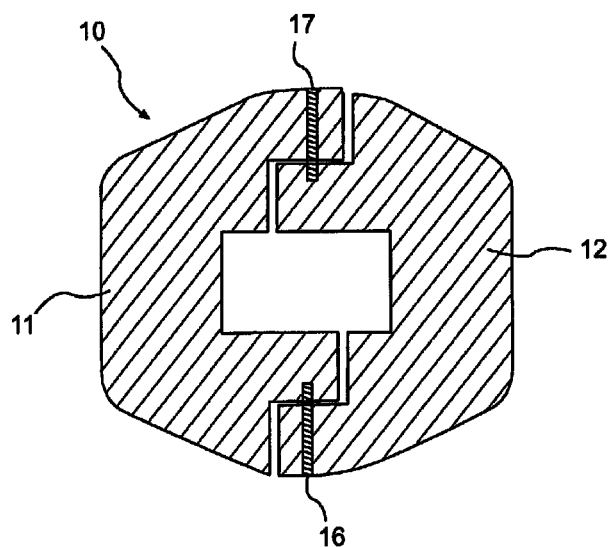
FIG. 7 is a cross-sectional view of fore and aft floats showing exemplary connecting bearing shafts.

In FIGS. 5 and 6, the spar 13 is shortened and the damper plate 9 is connected to the spar 13 using a cable or chain 31. The shortening of the spar allows for increased pitch motion and increased relative speed between float and spar in the surge mode of operation. The heave plate 14 connected through the cable 31 still allows for heave reaction force in the heave mode of operation and allows the damper plate 9 to be lower in the water to increase the effectiveness of the damper plate operation. A shorter spar 13 also reduces the overall system cost, optimization of power absorption, and optimization of PTO speed, lowers the damper plate position and increases heave response.

The spar 13 is designed to be relatively fixed in heave so that it resists the upward and downward heave motion of the floats. The spar 13 may also be designed such that it has a ballast chamber that varies the spar buoyancy between either positively buoyant when the wave trough is above the spar, or negatively buoyant when the wave crest is above the spar. Spar 13 is designed to transition between positive buoyancy and negative buoyancy, while maintaining the buoyancy to avoid sinking. This condition causes the heave motion of the spar 13 to move opposite (180 degrees out of phase) to the heave motion of floats 11 and 12. This diving and rising spar design is accomplished using a compressible ballast chamber in the lower section of the spar (not shown). When the wave crest is over spar 13, the higher pressure from the wave causes the ballast chamber to compress and causes the spar 13 to sink until the floats reach equilibrium buoyant state. Conversely, when the wave trough is over spar 13, the pressure on the buoyancy chamber is reduced, the ballast chamber expands, and spar 13 rises until the floats 11 and 12 reach an equilibrium buoyant state with the spar 13. This diving and rising action amplifies the range of motion between floats 11 and 12 and spar 13, and can be used to improve the wave converter performance. Additionally, it has been shown that proper ballast location in the spar can increase captured power and can also be used to optimize relative speed between the spar and floats.

A challenge to proper operation of this system is the control of directionality. The power extraction efficiency is improved by proper orientation of floats 11 and 12 and the rotation axes with respect to the incoming wave front. Generally, performance is maximized when the axis of rotation is parallel to the incoming wave front, and minimized when the axis of rotation is perpendicular to the incoming wave front. Depending on the incident wave energy the system performance can be optimized and stabilized by changing the float orientation with respect to the incoming waves. It is recognized that in very energetic sea states, it may be desirable to decrease performance by changing the float orientation to a less efficient position.

Figure 10:
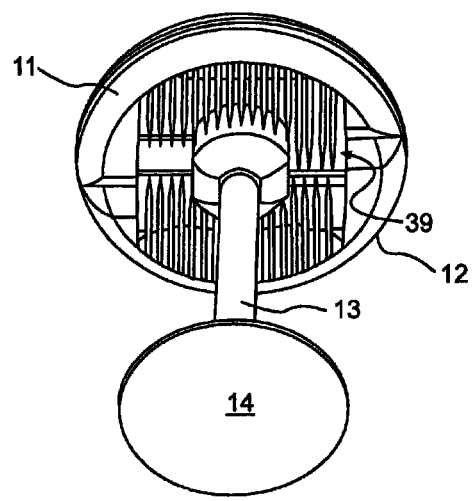
FIG. 10 is an isometric view of an example wave energy converter.

Directionality is affected by direction of water flowing past the device. The mean drift current of the incident wave climate is one source of current flow acting on the buoy. Another source of water flow acting on the body is the predominant ocean current acting on the buoy body. Wind acting on the buoy body above the water surface will also affect directionality. Directional vanes 39, shown in FIG. 10, can be used to channel water on the underside of floats 11 and 12. These vanes can be installed on the fore float 11, the aft 12, or both, depending on the preferred affect. Directional vanes 39 will cause floats 11 and 12 to align with the direction of flow acting on them. As depicted in FIG. 10, the directional vanes 39 are shrouded by the outer hull of the floats. By shrouding the directional vanes 39, the directional effects from the wave action will be increased due to the wave acting from under the float body, while the effects from ocean current will be minimized. The size, length and aspect ratio of the directional vanes 39 may be varied to increase or decrease the magnitude of the effect of the vanes on directionality. Directional vanes 39 can alternatively be used on the aft float 12 only to provide a rudder effect to keep the device pointed into the wave.

Figure 11:
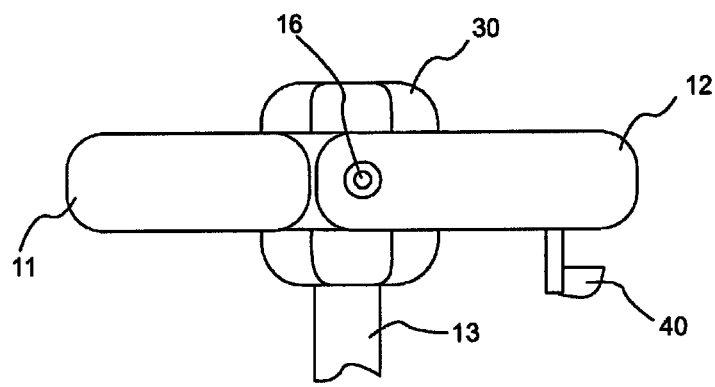
FIG. 11 is a side view of an embodiment of the wave energy converter of the present invention.

In another embodiment, a rudder 40, shown in FIG. 11 can be used to control float orientation in the wave. More than one rudder may also be used. The rudder may be positioned in all 360 degrees of rotation. The rudder is statically positioned, manually controlled, or automatically controlled using existing technology similar to an automatic pilot used on numerous vessels. The control for the rudder takes into account the prevailing wave direction, prevailing currents, wind, and drift and sets the rudder to maintain the desired buoy direction.

Figure 12:
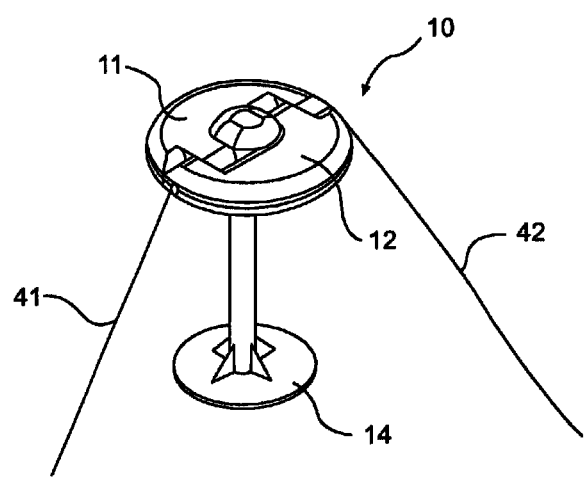
FIG. 12 is an isometric view of an example wave energy converter.

In another embodiment, a two point mooring system is used to control directionality. This system may be slack moored as depicted in FIG. 12. In FIG. 12, a slack mooring line 41 attaches to bearing shaft 16 and a second mooring line 42 attached to bearing shaft 17. A mechanism such as a chain winch 43, shown in FIG. 14, can be used to shorten or lengthen either mooring line. This will create a rotation on the float such that can be oriented in the desired direction.

Figure 13:
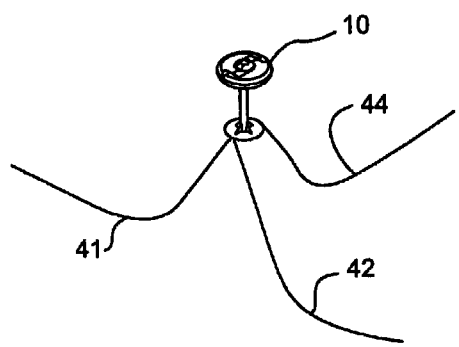
FIG. 13 is an isometric view of an example wave energy converter.
Figure 14:
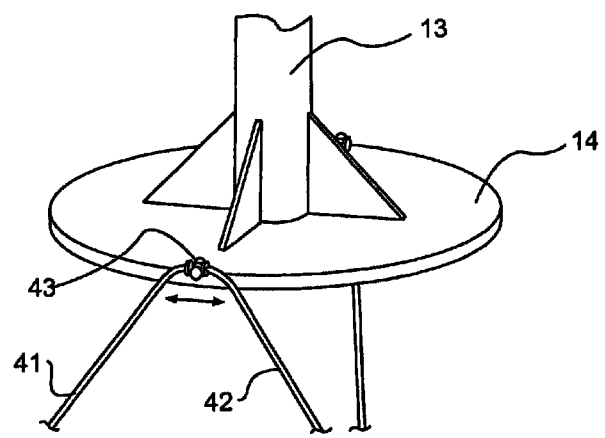
FIG. 14 is a partial isometric view of the present inventions.
Figure 15:
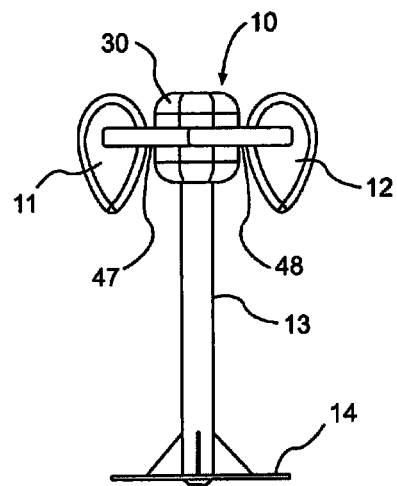
FIG. 15 is an isometric view of an example wave energy converter.

In another embodiment, a three point mooring system is used to control directionality. This system may be slack moored as depicted in FIG. 13. Mooring lines 41, 42 and 44 can attach to the heave plate 14 of converter 10 by conventional means. In one embodiment, mooring lines 41 and 42 form a common connection point to the heave plate 14 through a chain winch 43 as shown in FIG. 14. By adjusting the direction of chain as shown in FIG. 14, the heave plate 14 can be forced to rotate into the desired direction so as to orient the converter 10 in the desired direction.

In another embodiment, the top surface area of float 11 and float 12 in FIG. 1 are covered with an array of solar panels 52 and 53. This is of particular interest due to the large and un-blocked surface area that is in direct line of sight with the sun. Complementing the wave power with solar power provides for a more continuous power delivery from each WEC especially when wave energy is low during summer months.

The geometry of system components can be optimized for use on different bodies of water during different seasons based on many factors. The floats 11 and 12 may be constructed with a narrow width to length ratio, or it might have a wide aspect ratio. Float geometry is optimized for wave height, wave period, seasonal wave spectral density, power capture, and directionality considerations. Float shape is not limited by the geometry depicted and may take on a more curved disc shape. The floats 11 and 12 might also be cylindrical or rectangular in shape. Similarly, the diameter or length of the spar 13 may be altered for performance enhancements.

Figure 16:
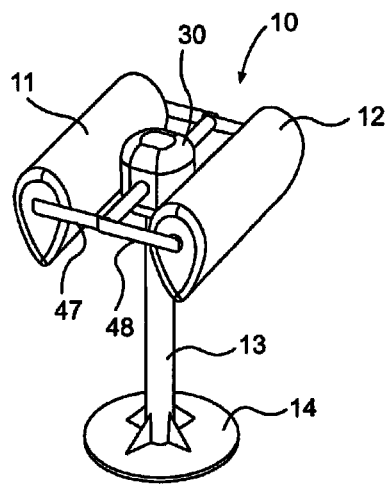
FIG. 16 is an isometric view of an example wave energy converter.
Figure 17:
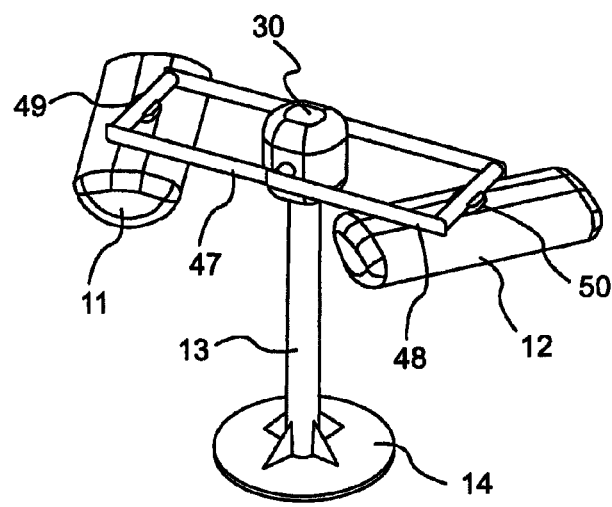
FIG. 17 is an isometric view of an example wave energy converter.
Figure 18:
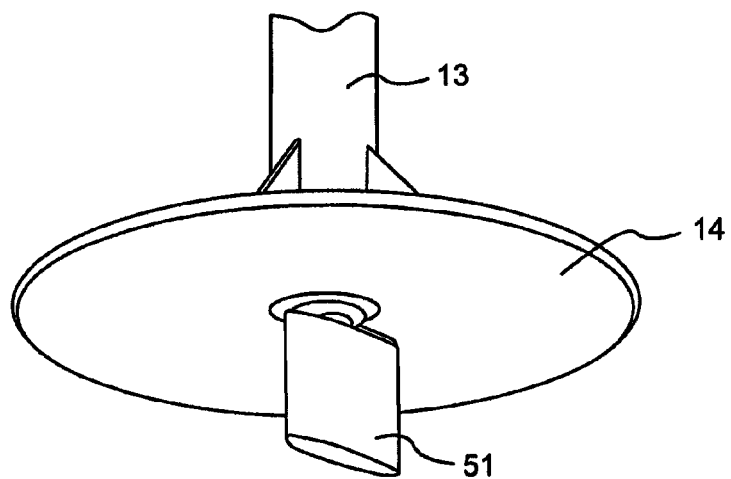
FIG. 18 is a partial isometric view of an example wave energy converter.
Figure 19:
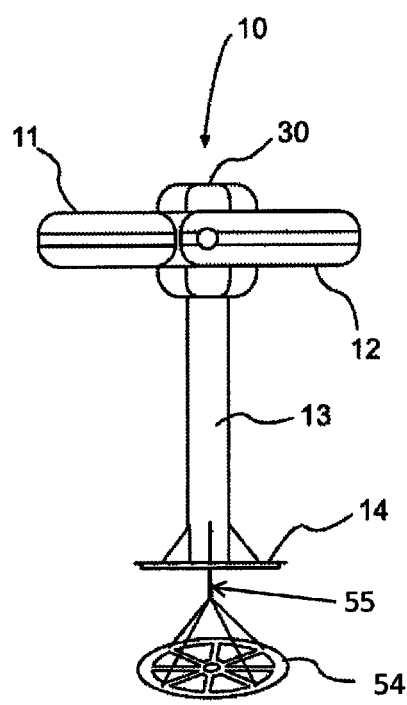
FIG. 19 is an isometric view of an example wave energy converter.

Depending on the wave conditions, for example the distance between a wave peak and a wave trough, it may be advisable to separate floats 11 and 12, using adjustable arms as shown in FIG. 17, alter the shape of the floats as shown in FIG. 16, re-orient the floats as shown in FIG. 17 and FIG. 18, add additional damper plates as shown in FIG. 19, or, in shallower waters, embed the spar in the sea floor.

With regard to FIG. 16, it should be noted that the side profile of floats 11 and 12, shown here as a tear-dropped shape, can be mounted to arms 47 and 48, respectively, such that they can rotate about of center axis of the arms. The shape of the float is not limited. Float shape is to be optimized for hydrodynamic performance. These floats can include cylinders, squares, triangles and any combinations of curves. Nor is the rotation axis limited, but can be varied. The rotation of the floats changes the hydrodynamic performance, including water plain stiffness of the float, the float's center of gravity, and float free-board. Variable ballasting of floats 11 and 12 could provide additional hydrodynamic optimization.

As shown in FIG. 17, the length of arms 47 and 48 can vary to suit the water conditions or to control the amount of energy being absorbed. In this embodiment of a wave energy converter, floats 11 and 12 are rotably connected to arms 47 and 48, respectively, via mounting 49 and 50, respectively. The yaw rotation of the floats allows the floats to rotate so as to be perpendicular to the axis of rotation of the PTO in housing 30. The floats can also rotate on arms 47 and 48 so as to be parallel with the axis of rotation of that PTO, or somewhere in between the parallel and perpendicular positions. Indeed, the orientation of the two floats can differ as shown in FIG. 17. The floats can be automatically or manually adjusted to control the amount of energy being absorbed from a wave.

As shown in FIG. 18, it is also possible to add a rudder 51 to the bottom of heave plate 14 in lieu of, or in addition to, directional vanes 39 of FIG. 10, rudder 40 of FIG. 11, or a combination of the two. Rudder 51 may be automatically or manually positioned to control the direction of the wave energy converter relative to the direction of wave travel.

As shown in FIG. 19, it is also possible to suspend a damper plate 52 from heave plate 14 to stabilize spar 13. For the same reason, it is also possible to suspend a damper plate 52 from damper plate 9, or a second heave plate (not shown) from heave plate 14, or a combination of these plates to stabilize the operation of the wave energy converter of the present invention.

As can be readily understood from the foregoing description of the invention, the preferred structure and method of operation have been described, but other structures and approaches can be substituted therefore without departing from the scope of the invention.

The invention claimed is:

1. A wave energy converter comprising:
   i) a motor housing having a central longitudinal axis;
   ii) a spar mated with the motor housing and having a bottom end region for extension into a body of water;
   iii) a first float positioned to rotate about the motor housing;
   iv) a second float positioned to rotate about the motor housing; and
   v) a first power take off mounted within the motor housing, the first power take off being rotably coupled to the first float by a first drive shaft oriented parallel to the central longitudinal axis; and
   vi) a second power take off mounted within the motor housing, the second power take off being rotably coupled to the second float by a second drive shaft oriented parallel to the central longitudinal axis.

2. The wave energy converter of claim 1, wherein the first power takeoff and the second power take off are low speed, high torque electrical generators.

3. The wave energy converter of claim 2, wherein the first and second low speed, high torque electrical generators comprise a stator section fixedly mounted to an interior portion of the motor housing and a rotor section rotably coupled to the first or second drive shaft.

4. The wave energy converter of claim 1, wherein a heave plate is mounted to the bottom end region of the spar.

5. The wave energy converter of claim 4 wherein a flexible member is mounted to the bottom end region and further wherein a damper plate is mounted to the flexible member.

6. The wave energy converter of claim 1, wherein a flexible member is mounted to the bottom end region and further wherein a damper plate is mounted to the flexible member.

7. The wave energy converter of claim 1, further comprising a mooring comprising two or more mooring lines thereby providing direction control.

8. The wave energy converter of claim 7 wherein the mooring comprises a mechanism for lengthening or shortening at least one mooring line.

9. The wave energy converter of claim 8 wherein the mechanism for lengthening or shortening at least one mooring line comprises a cable winch or a chain winch.

10. The wave energy converter of claim 1, wherein the spar further comprises a hinge point about which at least a portion of the spar pivots.

11. The wave energy converter of claim 1, further comprising at least one directional vane/rudder.

12. The wave energy converter of claim 1, wherein the wave energy converter has both a center of gravity and a center of buoyancy and further wherein each is positioned to dynamically adjust to changes in a sea-state.

13. The wave energy converter of claim 1 wherein the first or second power take off is selected from the group consisting of a gearbox drive electrical generator, a water pump, a water desalinator, a pneumatic pump and a hydraulic pump.

14. A method for generating power comprising the steps of:
   i) providing a wave energy converter comprising:
      (1) a motor housing having a central longitudinal axis;
      (2) a spar mated with the motor housing and having a bottom end region for extension into a body of water;
      (3) a first float positioned to rotate about the motor housing;
      (4) a second float positioned to rotate about the motor housing; and
      (5) a first power take off mounted within the motor housing, the first power take off being rotably coupled to the first float by a first drive shaft oriented parallel to the central longitudinal axis; and
      (6) a second power take off mounted within the motor housing, the second power take off being rotably coupled to the second float by a second drive shaft oriented parallel to the central longitudinal axis coaxial with the first drive shaft; and
   ii) deploying the wave energy converter within a wave field.

15. The method of claim 14, further comprising orienting the wave energy converter relative to the wave field using at least one directional vane/rudder operatively coupled to the wave energy converter.

16. The method of claim 14, further comprising pivoting at least a portion of the spar about a hinge point positioned along a length of the spar.

17. The method of claim 14, further comprising mooring the wave energy converter in the wave field using a mooring comprising two or more mooring lines.

18. The method of claim 17, further comprising orienting the wave energy converter relative to the wave field by lengthening or shortening at least one mooring line.

19. The method of claim 18, wherein the lengthening or shortening of the at least one mooring line is performed by a cable winch or a chain winch.

* * * * *